United States Patent
Cho et al.

(10) Patent No.: US 9,341,260 B2
(45) Date of Patent: May 17, 2016

(54) SHIFT CONTROL METHOD FOR DCT VEHICLE

(71) Applicants: Hyundai Motor Company, Seoul (KR); Kia Motors Corp., Seoul (KR)

(72) Inventors: Sung Hyun Cho, Yongin-si (KR); Ho Sung Kim, Anyang-si (KR); Sang Mo Ha, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/562,021

(22) Filed: Dec. 5, 2014

(65) Prior Publication Data

US 2015/0337952 A1  Nov. 26, 2015

(30) Foreign Application Priority Data

May 21, 2014  (KR) .................. 10-2014-0061058

(51) Int. Cl.
| | | |
|---|---|---|
| B60W 10/02 | (2006.01) | |
| B60W 10/06 | (2006.01) | |
| B60W 10/113 | (2012.01) | |
| F16H 61/10 | (2006.01) | |
| B60W 10/10 | (2012.01) | |

(52) U.S. Cl.
CPC .............. *F16H 61/10* (2013.01); *B60W 10/02* (2013.01); *B60W 10/06* (2013.01); *B60W 10/10* (2013.01); *B60W 2510/06* (2013.01); *B60W 2710/021* (2013.01); *B60W 2710/0666* (2013.01); *B60W 2710/10* (2013.01)

(58) Field of Classification Search
None
See application file for complete search history.

(56) References Cited

U.S. PATENT DOCUMENTS

| 5,031,746 | A | * | 7/1991 | Koivunen | ............... | F16D 25/02 |
| | | | | | | 192/48.611 |
| 2004/0166990 | A1 | * | 8/2004 | Buchanan | ............. | B60W 10/06 |
| | | | | | | 477/174 |
| 2014/0195131 | A1 | * | 7/2014 | Porto | .................... | F16H 61/688 |
| | | | | | | 701/60 |

FOREIGN PATENT DOCUMENTS

| JP | 2007-92815 A | 4/2007 |
| JP | 2013-036478 A | 2/2013 |
| JP | 2013-057373 A | 3/2013 |
| KR | 10-1998-0037707 A | 8/1998 |
| KR | 10-2006-0067698 A | 6/2006 |
| KR | 10-2011-0109022 A | 10/2011 |
| KR | 10-2014-0053729 A | 5/2014 |
| WO | WO 03/074312 A2 | 9/2003 |

* cited by examiner

*Primary Examiner* — Edwin A Young
(74) *Attorney, Agent, or Firm* — Morgan, Lewis & Bockius LLP

(57) ABSTRACT

A shift control method for a dual clutch transmission (DCT) vehicle may include, performed by a controller of the DCT, an actual shift determining step, a cooperation control termination determining step, a flare determining step, an engine torque reducing step, a torque adding step, an engine torque raising step, and a shift finishing step of reducing an amount of reduction of the engine torque until synchronization is completed in proportion to a synchronization prediction time in which it takes an engine speed to reach a synchronization speed when the synchronization prediction time is smaller than a reference time during which the torque adding step and the engine torque raising step are performed, and having slip control over an engagement-side clutch.

5 Claims, 2 Drawing Sheets

SHIFT CONTROL METHOD FOR DCT VEHICLE

CROSS REFERENCE TO RELATED APPLICATION(S)

The present application claims priority to Korean Patent Application Number 10-2014-0061058 filed May 21, 2014, the entire contents of which is incorporated herein for all purposes by this reference.

BACKGROUND OF THE INVENTION

1. Field of the Invention

The present invention relates, in general, to a shift control method for a dual clutch transmission (DCT) vehicle and, more particularly, to a power-on upshift control method.

2. Description of Related Art

Vehicles equipped with a dual clutch transmission (DCT) are designed to exhibit performance similar to an automatic transmission to the utmost extent while maintaining characteristics of a typical manual transmission.

In DCT vehicles, when a driver steps on an accelerator pedal to change a current shift stage to a higher shift stage (so-called power-on upshift), an engine speed is controlled to be rapidly adjusted to a synchronization speed of the higher shift stage.

In this case, the driver perceives a reduction in engine speed. For this reason, if the driver further steps on the accelerator pedal. This may cause a flare phenomenon in which the engine speed is again raised. If this phenomenon occurs, the shifting fails to be rapidly completed or is delayed; which leads to a reduction in shifting performance. When a clutch constituting the DCT is a dry clutch, heat energy is accumulated to have an adverse influence on durability of the clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control method for a dual clutch transmission (DCT) vehicle, which is adapted to prevent an engine flare phenomenon with proper countermeasures when an engine speed is reduced toward a synchronization speed of a target shift stage; and is raised again due to a change in an operation amount of an accelerator pedal controlled by a driver in a power-on upshift process of a DCT vehicle, and to cause the engine speed to rapidly converge on the synchronization speed so as to be able to complete rapid shifting, thereby making it possible to improve shifting performance and to prevent a decrease in durability of a dry clutch constituting a DCT.

According to various aspects of the present invention, a shift control method for a DCT vehicle may include an actual shift determining step of determining, by a controller of the DCT, whether or not power-on upshift is being actually performed, a cooperation control termination determining step of determining, by the controller of the DCT, whether or not first engine cooperation control is terminated when the power-on upshift is being actually performed, a flare determining step of determining, by the controller of the DCT, whether or not engine flare begins to occur when the first engine cooperation control is terminated, an engine torque reducing step of requesting, by the controller of the DCT, second engine cooperation control when it is determined that the engine flare begins to occur and reducing engine torque by a predetermined amount of reduction for a first reference time, a torque adding step of applying, by the controller of the DCT, greater clutch control torque than that applied in typical shifting to an engagement-side clutch when the engine torque is reduced, an engine torque raising step of reducing, by the controller of the DCT, the amount of reduction of the engine torque according to an increment of the control torque of the engagement-side clutch and making a request for gradually increasing the engine toque, and a shift finishing step of reducing, by the controller of the DCT, the amount of reduction of the engine torque until synchronization is completed in proportion to a synchronization prediction time which it takes an engine speed to reach a synchronization speed when the synchronization prediction time is smaller than a second reference time during which the torque adding step and the engine torque raising step are performed, and having slip control over the engagement-side clutch.

The flare determining step may include determining that the flare begins to occur when slip angular acceleration of the engagement-side clutch is greater than zero.

In the engine torque reducing step, the predetermined amount of reduction of the torque by which the engine torque is reduced may be a value determined according to target angular acceleration of the engine, and the first reference time may be determined as a time required for the angular acceleration of the engine to reach the target angular acceleration according to the amount of reduction of the torque.

The engine torque raising step may be performed along with the torque adding step.

The second reference time may be set in consideration of a time required to remove the amount of reduction of the engine torque to finish the shift due to near completion of the synchronization.

The present invention is adapted to prevent an engine flare phenomenon with proper countermeasures when an engine speed is reduced toward a synchronization speed of a target shift stage and is raised again due to a change in an operation amount of an accelerator pedal controlled by a driver in a power-on upshift process of a DCT vehicle, and to cause the engine speed to rapidly converge on the synchronization speed so as to be able to complete rapid shifting, thereby making it possible to improve shifting performance and to prevent a decrease in durability of a dry clutch constituting a DCT.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
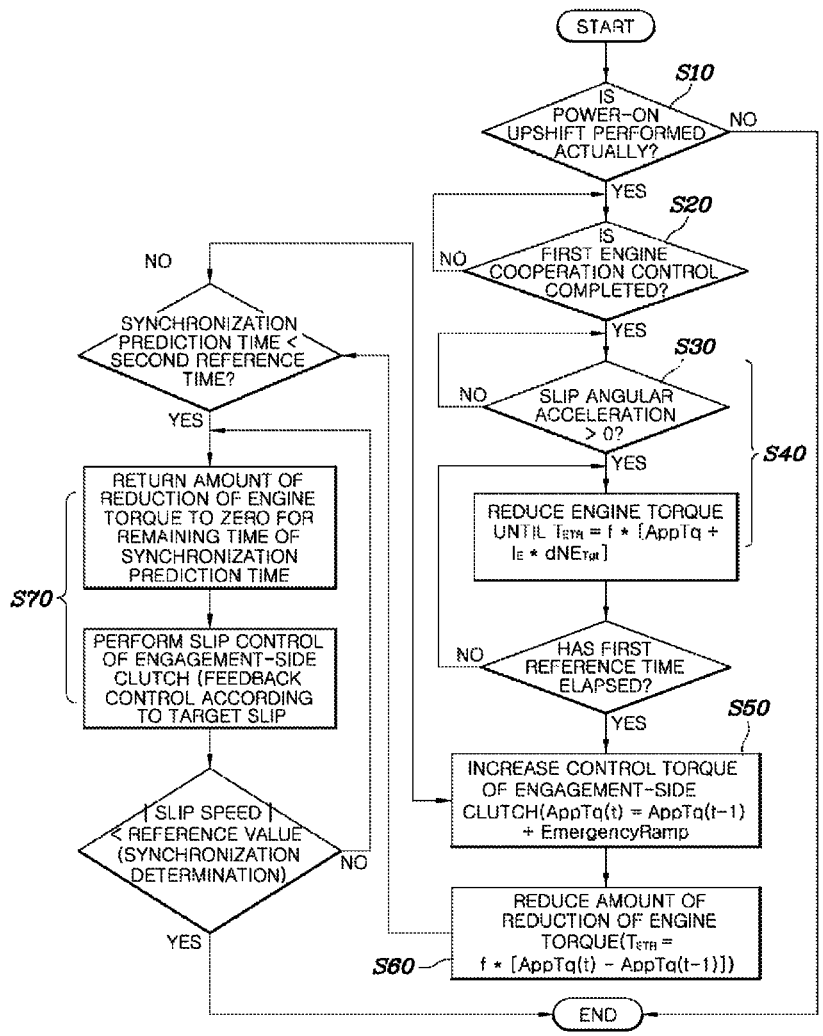
FIG. 1 is a flow chart illustrating an exemplary shift control method for a DCT vehicle according to the present invention.
Figure 2:
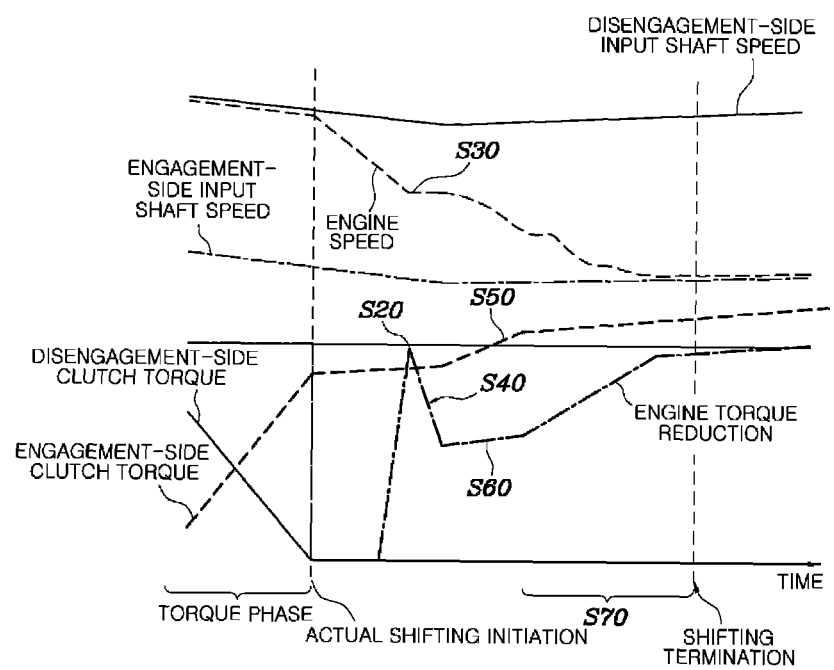
FIG. 2 is a graph illustrating the exemplary shift control method for the DCT vehicle according to the present invention.

Referring to FIG. 1 and FIG. 2, a shift control method for a dual clutch transmission (DCT) vehicle according to various embodiments of the present invention includes an actual shift determining step S10 of determining whether or not power-on upshift is being actually performed, a cooperation control termination determining step S20 of determining whether or not first engine cooperation control is terminated when the power-on upshift is being actually performed, a flare determining step S30 of determining whether or not engine flare begins to occur when the first engine cooperation control is terminated, an engine torque reducing step S40 of requesting second engine cooperation control when it is determined that the engine flare begins to occur and reducing engine torque by a predetermined amount of reduction for a first reference time, a torque adding step S50 of applying greater clutch control torque than that applied in typical shifting to an engagement-side clutch when the engine torque is reduced, an engine torque raising step S60 of reducing the amount of reduction of the engine torque according to an increment of the control torque of the engagement-side clutch and making a request for gradually increasing the engine toque, a shift finishing step S70 of reducing the amount of reduction of the engine torque until synchronization is completed in proportion to a synchronization prediction time which it takes an engine speed to reach an synchronization speed when the synchronization prediction time is smaller than a second reference time during which the torque adding step S50 and the engine torque raising step S60 are performed, and having slip control over the engagement-side clutch.

To be specific, when there occurs an engine flare phenomenon in which the engine speed is reduced toward the synchronization speed and is raised again after the power-on upshift is initiated, the present invention requests an engine controller to reduce the engine torque so as to reduce the engine torque again, and controls the control torque of the engagement-side clutch to be greater than when the power-on upshift is performed. Thereby, the present invention prevents the engine flare phenomenon in which the engine speed is raised, and causes the shift to be rapidly finished, so that it is possible to improve a quality of shift and prevent durability of the clutch from being reduced.

A controller of a dual clutch transmission (DCT) may be configured to perform the above steps.

The actual shift in the actual shift determining step S10 refers to an inertia phase that is a process in which the engine speed actually begins to be slower than a speed of a disengagement-side input shaft after a torque phase of reducing torque of a disengagement-side clutch and raising torque of the engagement-side clutch, and is synchronized with a speed of an engagement-side input shaft.

Thus, in the actual shift determining step S10, it is determined that the engine speed is slower than the disengagement-side input shaft and is reduced toward the engagement-side input shaft.

The first engine cooperation control in which termination is determined in the cooperation control termination determining step S20 is performed to prevent a rapid drop of the engine speed and a shift shock during the normal, and is expressed to distinguish from second engine cooperation control that occurs in the future.

In the present invention, after the first engine cooperation control is terminated, it is determined in the flare determining step S30 whether or not the engine flare occurs. In the flare determining step S30, it is determined that the engine flare begins to occur when slip angular acceleration of the engagement-side clutch is greater than 0.

The slip angular acceleration of the engagement-side clutch ultimately refers to a rate of change in a difference between the engine speed and the speed of the engagement-side input shaft. When the slip angular acceleration is greater than 0, this means that the engine speed approaches the speed of the engagement-side input shaft and is raised while becoming apart from the speed of the engagement-side input shaft. This is adapted to determine a start of an engine flare phenomenon.

In the engine torque reducing step S40, the predetermined amount of reduction of the torque by which the engine torque is reduced is a value calculated according to target angular acceleration of the engine. The first reference time is determined as a time which it takes the angular acceleration of the engine to reach the target angular acceleration according to the amount of reduction of the torque.

That is, the amount of reduction of the torque can be calculated by the following formula:

$T_{ETR} = f*[AppTq + I_E * dNE_{Tgt}]$, where $T_{ETR}$ is the amount of reduction of the torque, AppTq is the control torque of the engagement-side clutch, $I_E$ is the inertia moment of the engine, and $dNE_{Tgt}$ is the target angular acceleration of the engine.

Consequently, the amount of reduction of the torque is determined according to the target angular acceleration of the engine.

Here, the target angular acceleration of the engine is controlled such that the engine speed is changed to the synchronization speed in the event of the typical power-on upshift in which no engine flare occurs as in the situation of the present invention. Thereby, preferably, the shift control is adapted to be performed as in when no engine flare occurs as far as possible.

As described above, the engine torque is reduced again, and the control torque of the engagement-side clutch is controlled to have a greater value than the case of the typical power-on upshift by the torque adding step S50, so that the engine flare phenomenon is suppressed, and the engine speed begins to be reduced toward the speed of the engagement-side input shaft in a synchronizing direction again.

Here, the engine torque raising step S60 is performed along with the torque adding step S50, and is adapted to increase the control torque of the engagement-side clutch and to gradually reduce the amount of reduction of the torque of the engine to raise the torque of the engine. Thereby, the shift is prepared to be able to be finished in a more rapid way by preventing an excessive sudden drop of the engine speed and previously reducing the amount of reduction of the torque of the engine to be removed in the shift finishing step S70 below.

In the torque adding step S50, the control torque applied to the engagement-side clutch can be expressed by the following formula:

AppTq(t)=AppTq(t−1)+EmergencyRamp, where AppTq(t) is the current control torque of the engagement-side clutch, AppTq(t−1) is the just previous control torque of the engagement-side clutch, and EmergencyRamp is the amount of addition of the torque.

Therefore, as a control cycle proceeds, the control torque of the engagement-side clutch is gradually increased by the amount of addition of the torque.

The amount of reduction of the torque reduced in the engine torque raising step S60 can be expressed by the following formula:

$$T_{ETR} = f^* [AppTq(t) - AppTq(t-1)]$$

This formula expresses that the amount of reduction of the torque of the engine is determined by a function of a difference between the current control torque of the engagement-side clutch and the just previous control torque of the engagement-side clutch.

The engine torque raising step S60 and the torque adding step S50 are performed until it is predicted that the synchronization prediction time is made shorter than the second reference time, and the synchronization will be performed immediately. When the synchronization prediction time is shorter than the second reference time, feedback control for controlling a slip of the engagement-side clutch according to a target amount of the slip is performed in the shift finishing step S70. The amount of the slip is equal to or lower than a predetermined reference value, it is determined that the synchronization is completed, and thus the actual shift is completed.

Here, the synchronization prediction time is calculated according to the engine angular acceleration and the slip amount of the engagement-side clutch. The reference value for determining that the synchronization is completed is a value set by a test and analysis. For example, the reference value may be set to 50 rpm or less.

Further, in the shift finishing step S70, the amount of reduction of the engine torque caused by the second torque reduction request is completely restored to return to a state as if the second torque reduction request is not made, and thereby the engine torque is controlled normally.

The second reference time is preferably set in consideration of a time required to remove the amount of reduction of the engine torque to finish the shift due to near completion of the synchronization.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method for a dual clutch transmission (DCT) vehicle comprising:
    an actual shift determining step of determining, by a controller of the DCT, whether or not power-on upshift is being actually performed;
    a cooperation control termination determining step of determining, by the controller of the DCT, whether or not first engine cooperation control is terminated when the power-on upshift is being actually performed;
    a flare determining step of determining, by the controller of the DCT, whether or not engine flare begins to occur when the first engine cooperation control is terminated;
    an engine torque reducing step of requesting, by the controller of the DCT, second engine cooperation control when it is determined that the engine flare begins to occur and reducing engine torque by a predetermined amount of reduction for a first reference time;
    a torque adding step of applying, by the controller of the DCT, greater clutch control torque than that applied in typical shifting to an engagement-side clutch when the engine torque is reduced;
    an engine torque raising step of reducing, by the controller of the DCT, the amount of reduction of the engine torque according to an increment of the control torque of the engagement-side clutch and making a request for gradually increasing the engine torque; and
    a shift finishing step of reducing, by the controller of the DCT, the amount of reduction of the engine torque until synchronization is completed in proportion to a synchronization prediction time in which it takes an engine speed to reach a synchronization speed when the synchronization prediction time is smaller than a second reference time during which the torque adding step and the engine torque raising step are performed, and having slip control over the engagement-side clutch.

2. The shift control method according to claim 1, wherein the flare determining step includes determining that the flare begins to occur when slip angular acceleration of the engagement-side clutch is greater than zero.

3. The shift control method according to claim 1, wherein in the engine torque reducing step,
    the predetermined amount of reduction of the torque by which the engine torque is reduced is a value determined according to target angular acceleration of the engine, and
    the first reference time is determined as a time required for the angular acceleration of the engine to reach the target angular acceleration according to the amount of reduction of the torque.

4. The shift control method according to claim 1, wherein the engine torque raising step is performed along with the torque adding step.

5. The shift control method according to claim 1, wherein the second reference time is set in consideration of a time required to remove the amount of reduction of the engine torque to finish the shift due to near completion of the synchronization.

* * * * *